US010465801B2

(12) United States Patent
Jackson

(10) Patent No.: US 10,465,801 B2
(45) Date of Patent: Nov. 5, 2019

(54) RESETTABLE VALVE

(71) Applicants:A.V.K. Carbo-Bond, Inc., La Fox, IL (US); Strahman Valves, Inc., Bethlehem, PA (US)

(72) Inventor: Stewart Jackson, St. Charles, IL (US)

(73) Assignees: A.V.K Carbo-Bond, Inc., La Fox, IL (US); Strahman Valves, Inc., Bethlehem, PA (US)

( * ) Notice: Subject to any disclaimer, the term of this patent is extended or adjusted under 35 U.S.C. 154(b) by 113 days.

(21) Appl. No.: 15/211,942

(22) Filed: Jul. 15, 2016

(65) Prior Publication Data
US 2017/0016548 A1   Jan. 19, 2017

Related U.S. Application Data

(60) Provisional application No. 62/193,798, filed on Jul. 17, 2015.

(51) Int. Cl.
*F16K 1/22* (2006.01)
*F16K 31/06* (2006.01)
(Continued)

(52) U.S. Cl.
CPC ............... *F16K 1/221* (2013.01); *F03G 1/02* (2013.01); *F16K 17/386* (2013.01);
(Continued)

(58) Field of Classification Search
USPC ............... 251/129.15, 129.2; 169/19–22
See application file for complete search history.

(56) References Cited

U.S. PATENT DOCUMENTS 2,252,125 A * 8/1941 Hauser ................ F16K 31/12
137/624.15
2,302,848 A * 11/1942 Fitz .................... F16K 31/05
251/129.03
(Continued)

FOREIGN PATENT DOCUMENTS

CN          2637838 Y    9/2004
CN        200940722 Y    8/2007
(Continued)

OTHER PUBLICATIONS

Machine Translation of FR 2790553, France, Michel Le Saint, Feb. 3, 1999, Espacenet Translation.*
(Continued)

*Primary Examiner* — Mary E McManmon
*Assistant Examiner* — Daphne M Barry
(74) *Attorney, Agent, or Firm* — Myers Wolin, LLC

(57) ABSTRACT

A device for controlling a flow of fluid from a first side to a second side of a passageway, including: a valve situated within a connection between the first side and the second side; a spring configured to rotate the valve from a first position to a second position; a lever having a first end and a second end; an actuator configured to switch the lever between a first state and a second state by moving the first end; a mechanism for manual operation of the valve between the first position and the second position; and a declutch mechanism for engaging and disengaging the mechanism for manual operation with the valve; wherein the second end of the lever is configured to hold the spring from rotating the valve when the lever is in the first state, and to release the spring when the lever is in the second state.

15 Claims, 9 Drawing Sheets

(51) Int. Cl.
  *F16K 31/12* (2006.01)
  *F16K 17/38* (2006.01)
  *F16K 31/05* (2006.01)
  *F03G 1/02* (2006.01)

(52) U.S. Cl.
  CPC ............ *F16K 31/055* (2013.01); *F16K 31/06* (2013.01); *F16K 31/12* (2013.01)

(56) References Cited

U.S. PATENT DOCUMENTS

| | | | |
|---|---|---|---|
| 2,327,980 A | | 8/1943 | Bryant |
| 3,651,823 A | | 3/1972 | Milsted, Sr. |
| 3,992,991 A | | 11/1976 | Koch |
| 4,215,746 A | | 8/1980 | Hallden et al. |
| 4,310,012 A | * | 1/1982 | Billington ............... F16K 17/40 137/75 |
| 4,533,114 A | * | 8/1985 | Cory ..................... F16K 17/386 137/75 |
| 4,941,320 A | | 7/1990 | Kersten et al. |
| 5,472,008 A | * | 12/1995 | Boarin ................... F16K 17/30 137/517 |
| 6,769,448 B1 | * | 8/2004 | Williams .............. F16K 17/383 137/75 |
| 7,344,119 B2 | * | 3/2008 | Tsuchizawa ........ F16K 31/0603 251/129.15 |

FOREIGN PATENT DOCUMENTS

| | | | | |
|---|---|---|---|---|
| CN | 203082233 U | | 7/2013 | |
| FR | 2790533 A1 | * | 9/2000 | ........... F16K 31/563 |
| GB | 1428894 A | * | 3/1976 | ........... F16K 17/042 |
| GB | 2509751 A | | 7/2014 | |
| RU | 2186279 C2 | | 7/2002 | |
| RU | 28522 U1 | | 3/2003 | |
| RU | 108816 U1 | | 9/2011 | |
| WO | 99 54987 A1 | | 10/1999 | |
| WO | WO 0065314 A1 | * | 11/2000 | ............... G01F 1/24 |
| WO | WO 0248590 A1 | * | 6/2002 | ........... F16K 31/563 |

OTHER PUBLICATIONS

International Search Report with Written Opinion, dated Nov. 3, 2016, for corresponding international application PCT/US2016/042640.

Thermal Fire-Safe Ball Valve Assemblies; Assured Automation; https://assuredautomation.com; Accessed Jul. 10, 2015.

Wedgeplug Technical Catalog; Crane Energy; www.craneenergy.com; 2011.

International Preliminary Report on Patentability (IPRP), dated Feb. 1, 2018, for corresponding international application PCT/US2016/042640.

Extended European search report with supplementary European search report and the European search opinion issued by the European Patent Office for the corresponding European Patent Application No. 16828333.1, dated Feb. 14, 2019.

Communication pursuant to Rules 70(2) and 70a(2) EPC issued by the European Patent Office for corresponding European Patent No. 16828333.1 dated Mar. 5, 2019.

* cited by examiner

RESETTABLE VALVE

CROSS REFERENCE TO RELATED APPLICATIONS

This application claims the benefit of U.S. Provisional Application No. 62/193,798, filed Jul. 17, 2015, the contents of which are incorporated by reference herein.

FIELD OF THE INVENTION

The invention generally relates to fluid flow control devices. More particularly, the invention relates to a resettable emergency valve that will shut down the flow of a fluid or release the flow of a fluid in case of an emergency.

BACKGROUND

An emergency block valve (EBV) is used as a means of isolating flammable or toxic substances in the event of a leak or fire. The installation, and use, of EBV's in many hydrocarbon services will significantly reduce the potential of fire and explosion damages caused by loss of hydrocarbon containment situations; and a general improvement in overall plant safety for both capital assets, and operating and maintenance personnel. In hydrocarbon, and/or toxic services, EBV's will serve to mitigate the potential of significant environmental releases.

In another version of EBV, the flow of a fluid is released in case of an emergency. For example, the valve of a sprinkler system will open and release the water in the event of a fire.

Existing automatic EBVs typically are equipped with a rapid action motor pneumatic operator. Petrochemical and similar industries require periodic testing of critical valves of this nature. However, in the existing EBVs, after testing of the EBV operations, reset or rebuild will be required to make the EBV ready for service, and such reset or rebuild takes multiple persons and considerable amount of time.

Therefore, there is a need for an EBV that can be easily reset by one person to a fully operational status in a very short period of time, and that after testing, rebuilding will not be required.

SUMMARY

One embodiment of the invention provides a device for controlling a flow of fluid from a first side to a second side of a passageway, including: a valve situated within a connection between the first side and the second side; a spring configured to rotate the valve from a first position to a second position; a lever having a first end and a second end; an actuator configured to switch the lever between a first state and a second state by moving the first end; a means for manual operation of the valve between the first position and the second position; and a declutch mechanism for engaging and disengaging the means for manual operation with the valve; wherein the second end of the lever is configured to hold the spring from rotating the valve when the lever is in the first state, and to release the spring when the lever is in the second state.

DETAILED DESCRIPTION OF THE PREFERRED EMBODIMENTS

Figure 1:
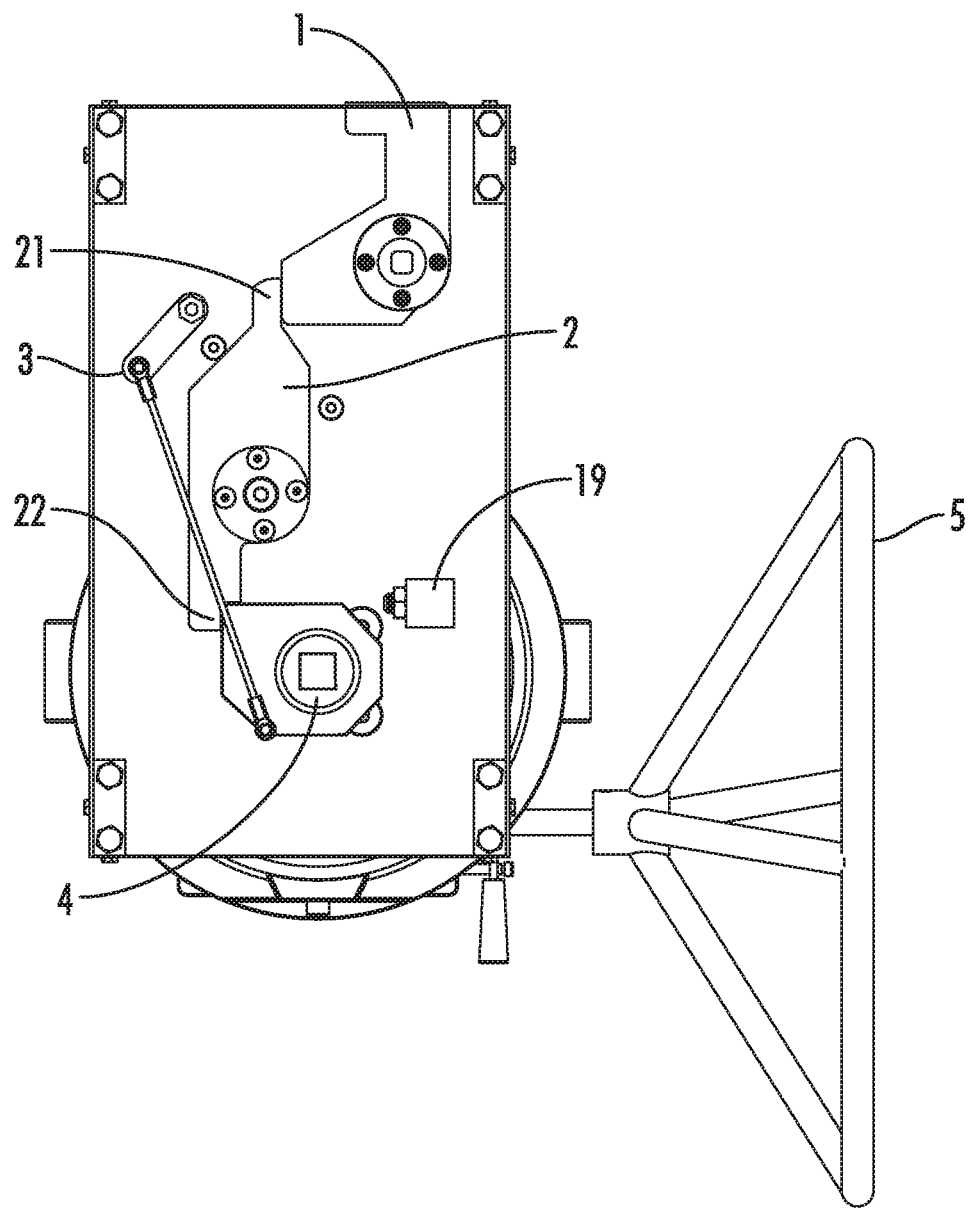
FIG. 1 illustrates a top view of an emergency block valve according to an embodiment.
Figure 2:
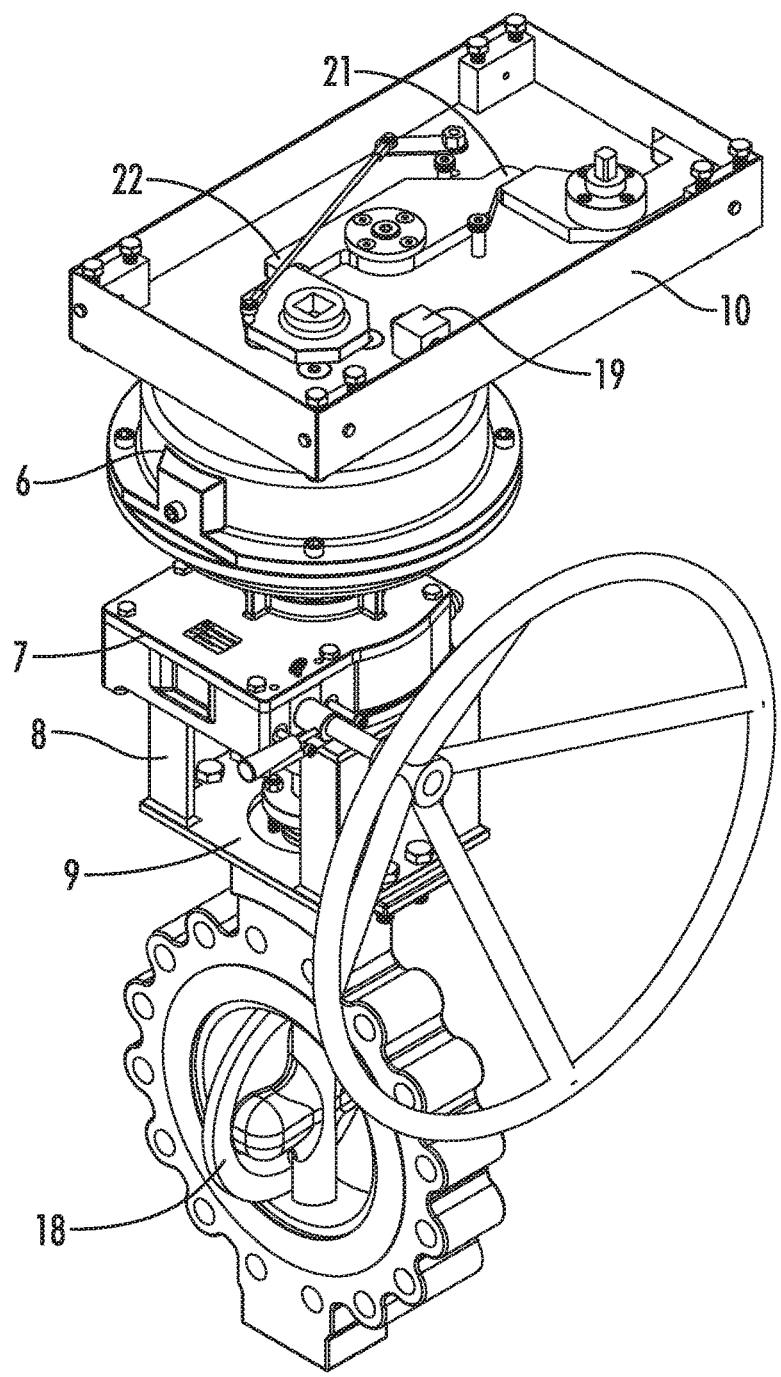
FIG. 2 illustrates a perspective view of an emergency block valve according to an embodiment.
Figure 3:
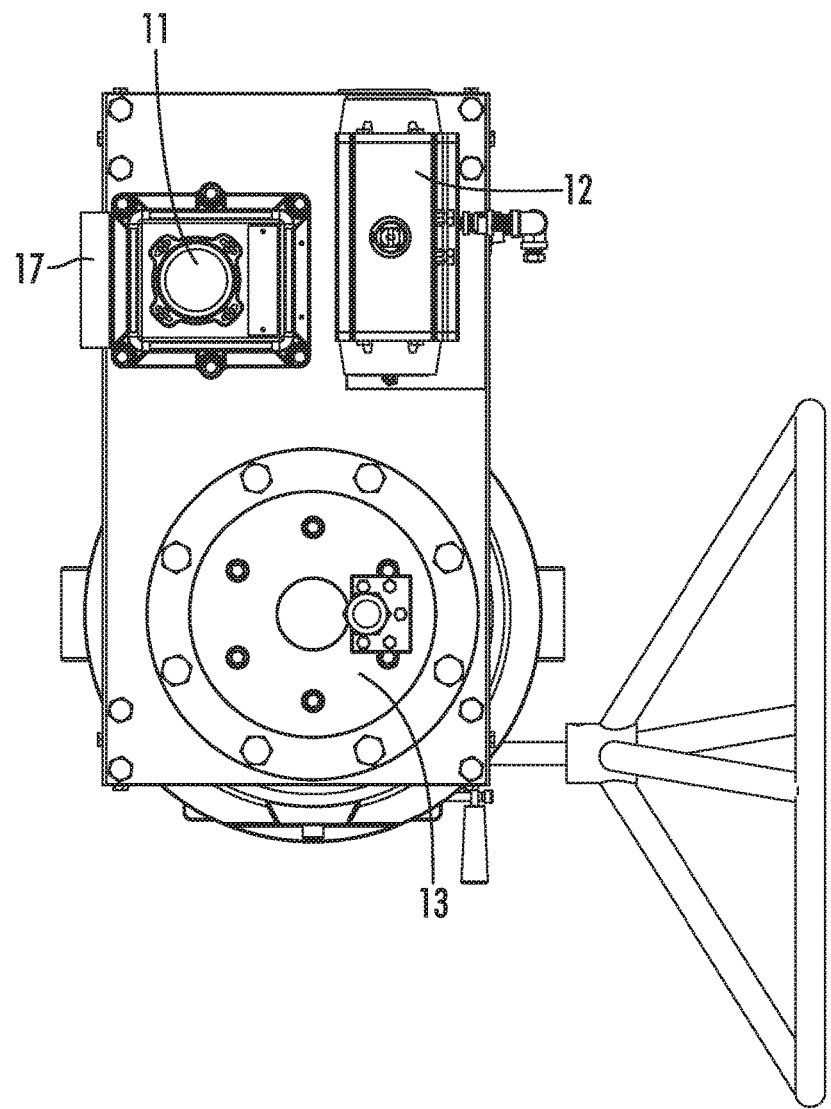
FIG. 3 illustrates a top view of an emergency block valve according to an embodiment.
Figure 4:
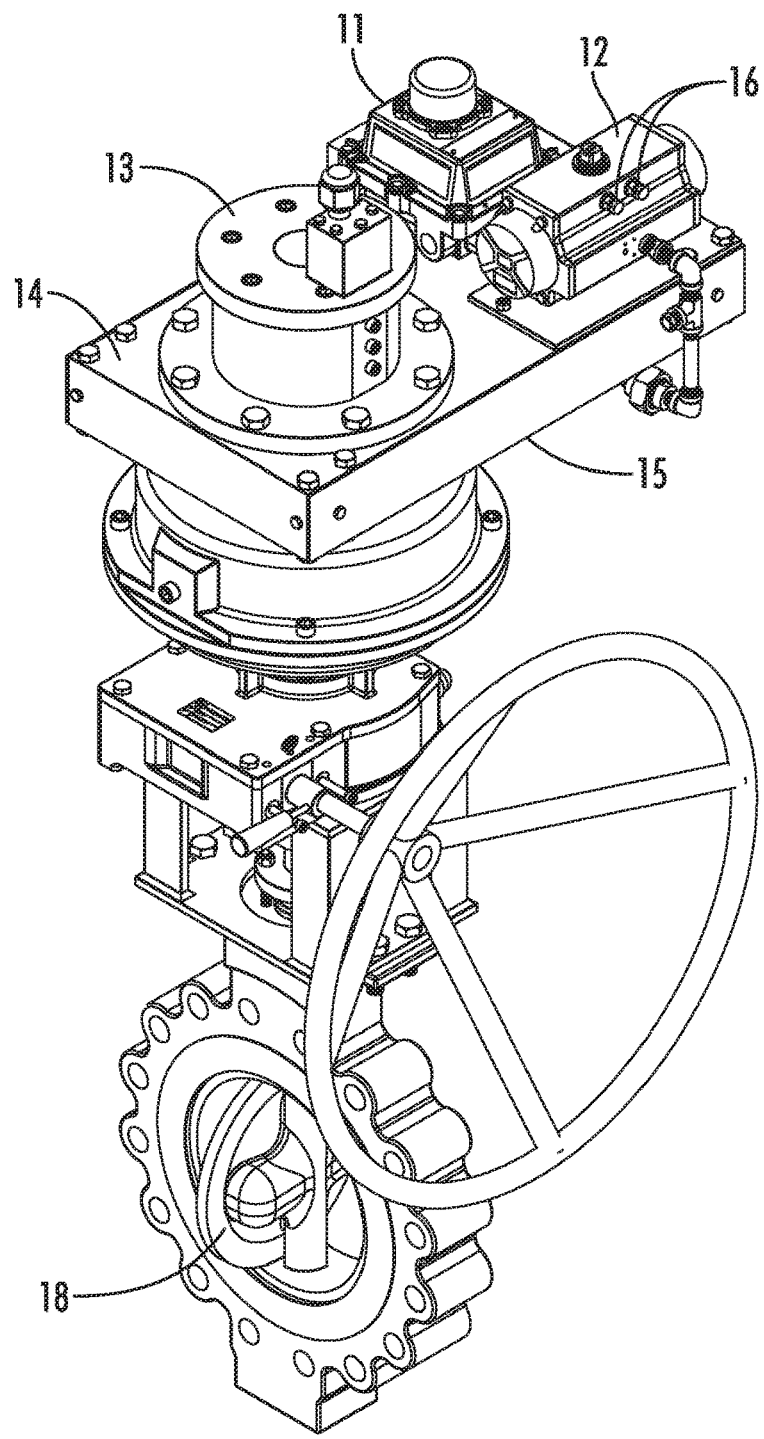
FIG. 4 illustrates a perspective view of an emergency block valve according to an embodiment.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

An emergency block valve (EBV) according to an embodiment is designed for critical applications in refineries, natural gas production pipelines, chemical facilities, or any other process involving flammable liquids or gases. In one embodiment, the EBV will shut down a valve (e.g., an API 607 ¼-turn valve) in case of flames or high local heat, reducing chances that dangerous media will further feed a fire. The unit also can be shut down through a remote signal in advance of an approaching fire. In addition to those safety features, the resettable EBV can be manually operated as part of a regular maintenance program, assuring proper function of this crucial safety device at all times.

Note that the specific EBV discussed in this document is used as an example embodiment for illustration purposes. Other non-limiting applications of the invention include flow controls of caustic or nocuous materials, etc.

FIGS. 1-4 show various views of an EBV according to an embodiment of the invention. As can be seen from FIGS. 2 and 4, there is a valve 18 that sits inside a chamber connecting the two sides of the EBV for a fluid to flow through a passageway.

In one embodiment, the valve is configured as a butterfly valve, and the valve changes between a fully open position to a fully closed position by a quarter-turn (90 degrees) of the valve 18. Note that although a butterfly valve is used as an example embodiment, use of other types of valve, such as ball valves, plug valves, gate valves, etc., as well as various valve closing/opening mechanisms are also contemplated.

The valve 18 is coupled to a spring pack 6 by the drive coupler 9. In one embodiment, the spring pack 6 includes a clock spring which exerts a rotational force to turn the valve 18 from the open position to the closed position. Note that it is contemplated that, in general, the valve may be configured to be moved from a first desired position to a second desired position.

In another embodiment, the spring exerts a rotational force to turn the valve 18 from the closed position to the open position. This another embodiment applies to systems where the flow of a fluid is desired in an emergency situation, for example, a sprinkler system.

In one embodiment, a dampening device 13 is used to dampen the spring's rotating force. Note that a spring is used to rotate the valve as a non-limiting example mechanism. Other mechanisms, such as, a motor, are contemplated for rotating the valve.

Enclosed by the top plate 14, bottom plate 15 and enclosure 10 is a lever switching mechanism according to an embodiment. A lever 2 with a first end 21 and a second end 22 is shown. When the second end 22 engages the spring cam 4, the spring is held from turning the valve 18. The lever 2 can be switched between an engaged state and a disengage state by an actuator. In one embodiment, an actuator drive coupler couples between the actuator drive and the actuator arm 1. The rotation of the actuator arm 1 moves the first end 21 of the lever 2, and the movement switches the state of the lever 2. The cam stop 19 prevents the spring from further rotating the valve 18. In one embodiment, a limit switch 11 is coupled to the spring cam 4 via a limit switch arm 3.

In one embodiment, the actuator is a pneumatic actuator 12 driven by air supplied to a supply port of the pneumatic actuator 12 via a solenoid valve 17. In one embodiment, the air line connected to the supply port of the pneumatic actuator 12 includes a fusible plug 16. Note that other types of actuator, such as electric driven actuator, motor driven actuator, magnetic driven actuator, etc., are also contemplated.

In one embodiment, the EBV is provided with a declutchable manual overdrive 7. A declutch lever 20 engages and disengages the handwheel 5 with the drive coupler 9. An operator can use the handwheel 5 to open or close the valve 18 when the declutch lever 20 is set to the engaged position. Although a handwheel 5 is shown as an example embodiment, other mechanisms, such as a lever, drive nut, etc., for manual turning the valve member is contemplated. In one embodiment, the declutchable manual overdrive 7 is supported by the pillar mounting bracket 8.

Figure 5A:
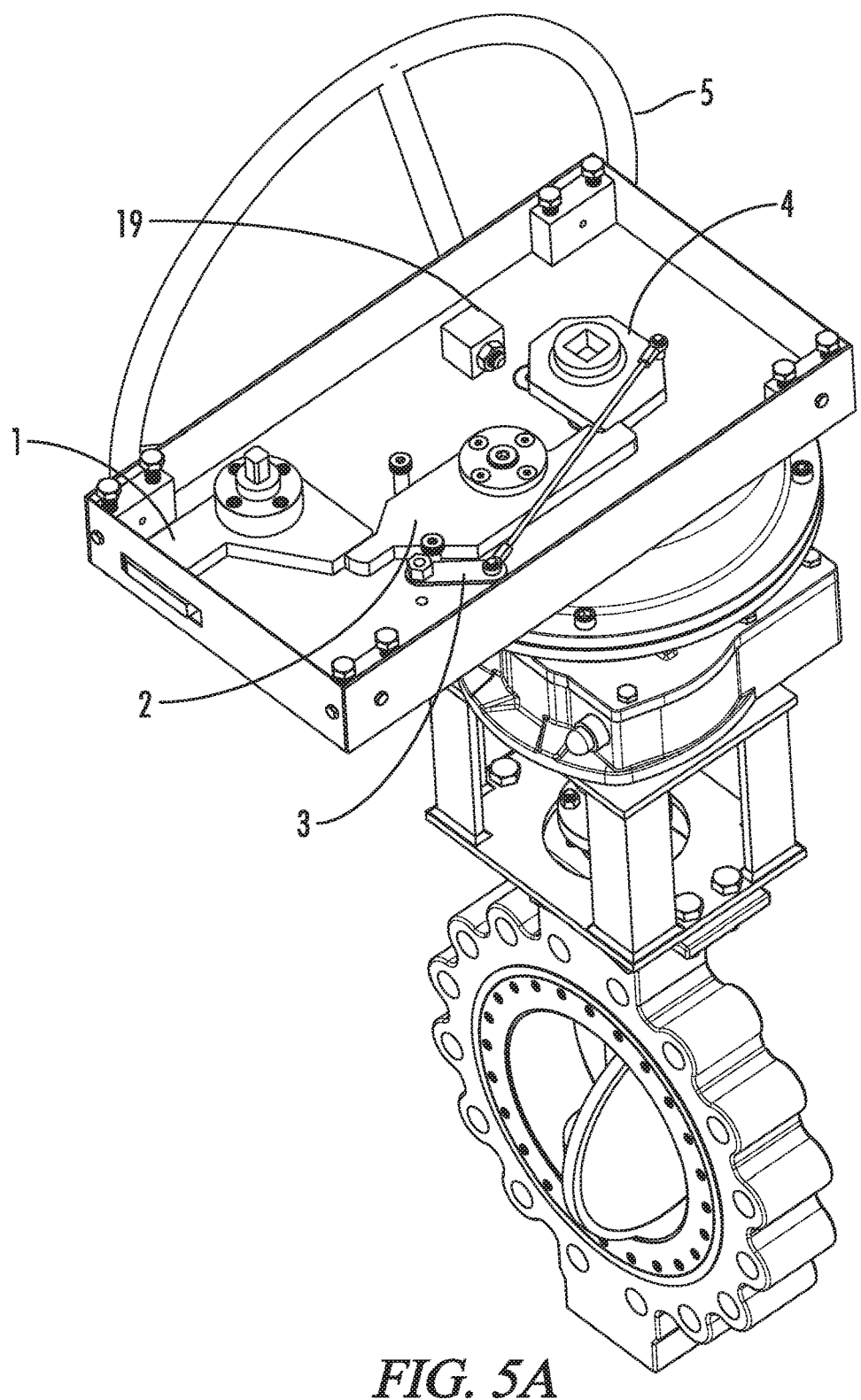
FIG. 5A illustrates a perspective view of an emergency block valve in the start position according to an embodiment.

The following operation steps of the EBV according to an embodiment of the invention illustrate various unique advantages of the EBV:

1. Activation (a) Start Position:

As shown in FIG. 5A, the unit is in the armed position. The spring cam 4 and actuator arm 1 are locked in place with the lever 2. Air is being supplied to the solenoid valve 17 to maintain the pneumatic actuator 12 in the full open (clockwise) position. The declutchable manual override 7 is disengaged.

Figure 5B:
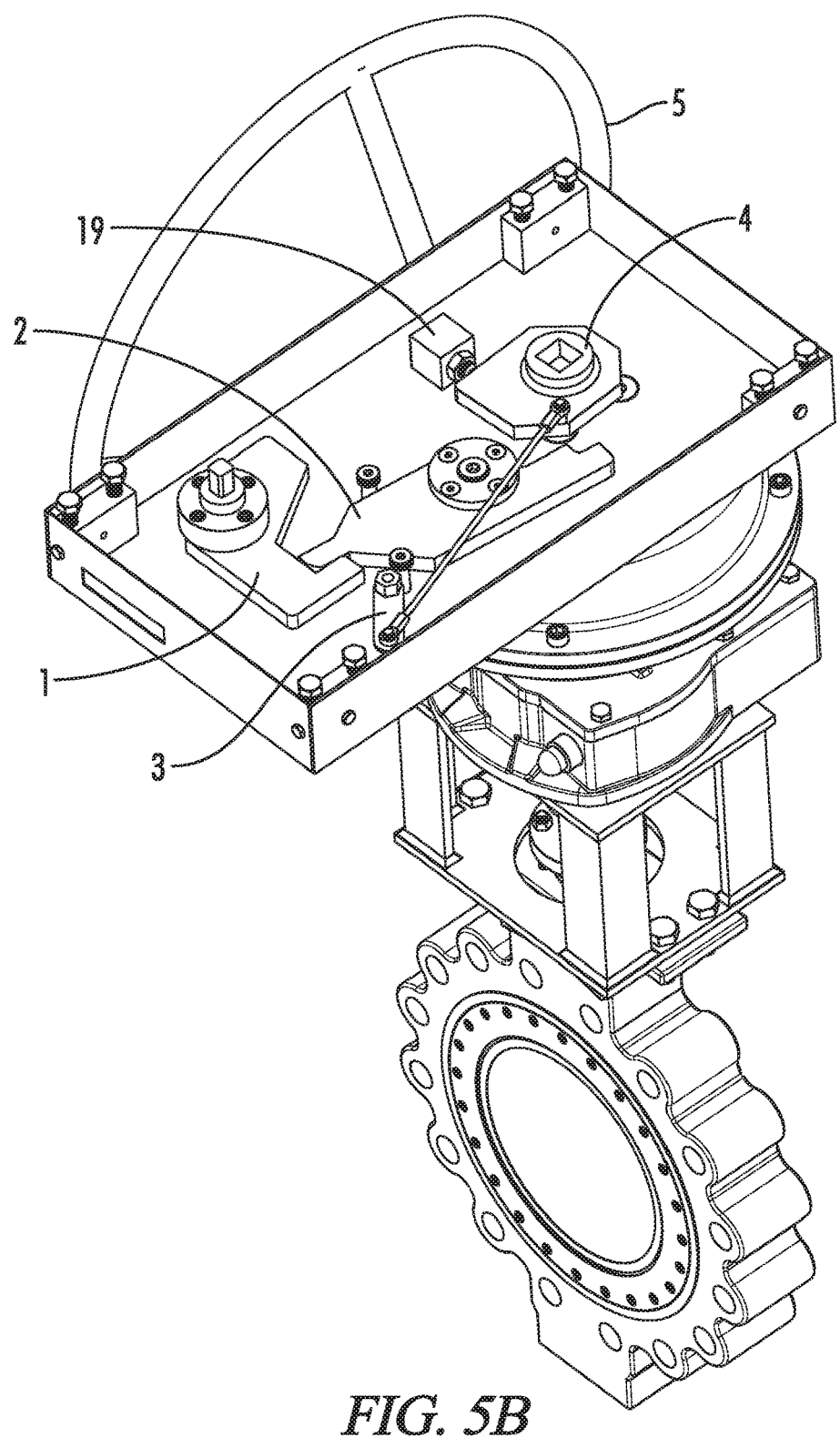
FIG. 5B illustrates a perspective view of an emergency block valve in the closed position according to an embodiment.

(b) Closed Through Local Heat/Fire:

In case of an emergency shut-down due to local heat/fire, a fusible plug 16 in the air line connected to the pneumatic actuator 12 supply port will melt, allowing air to vent to the atmosphere. Loss of air to the solenoid valve 17 will cause the pneumatic actuator to rotate to the full close (counter-clockwise) position while also driving the actuator arm 1 counter-clockwise. This will allow the lever 2 to release the spring cam 4, causing the spring 6 and dampening device 13 to freely rotate, resulting in a closed valve state shown in FIG. 5B. The spring drives the valve toward the closed (clockwise) position while the dampening device slows the spring closing force. Although the fusible plug is shown as an example embodiment, other sensors, such as a thermocouple, infrared detector, shock sensor, etc., may be used for detecting the presence of an emergency condition, and sensor can issue a signal to trigger the closing of the valve.

(c) Closed by Activating with Signal:

If the operator wants to close the valve in the absence of local fire/heat, an electric signal (e.g., 24 VDC) is sent to the solenoid valve 17 or the limit switch 11. The voltage signal causes the solenoid valve to shift, resulting in the same series of movements listed above to shut the valve. In another embodiment, a sensor detects an emergency condition and sends the electrical signal to the solenoid valve.

Figure 6:
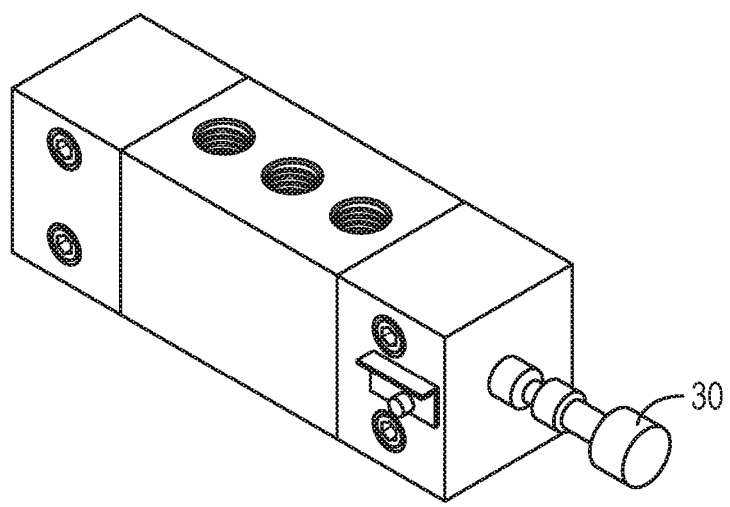
FIG. 6 illustrates a solenoid with a pushbutton control according to an embodiment.

(d) Closed by Activating with Pushbutton:

If the operator wants to manually close the valve through an air signal, it can also be done locally at the unit by using the solenoid pushbutton 30 shown in FIG. 6. Depressing the pushbutton 30 causes the solenoid valve to shift, resulting in the same series of movements listed above to shut the valve.

2. Exercising the Unit/Manual Operation

Figure 7A:
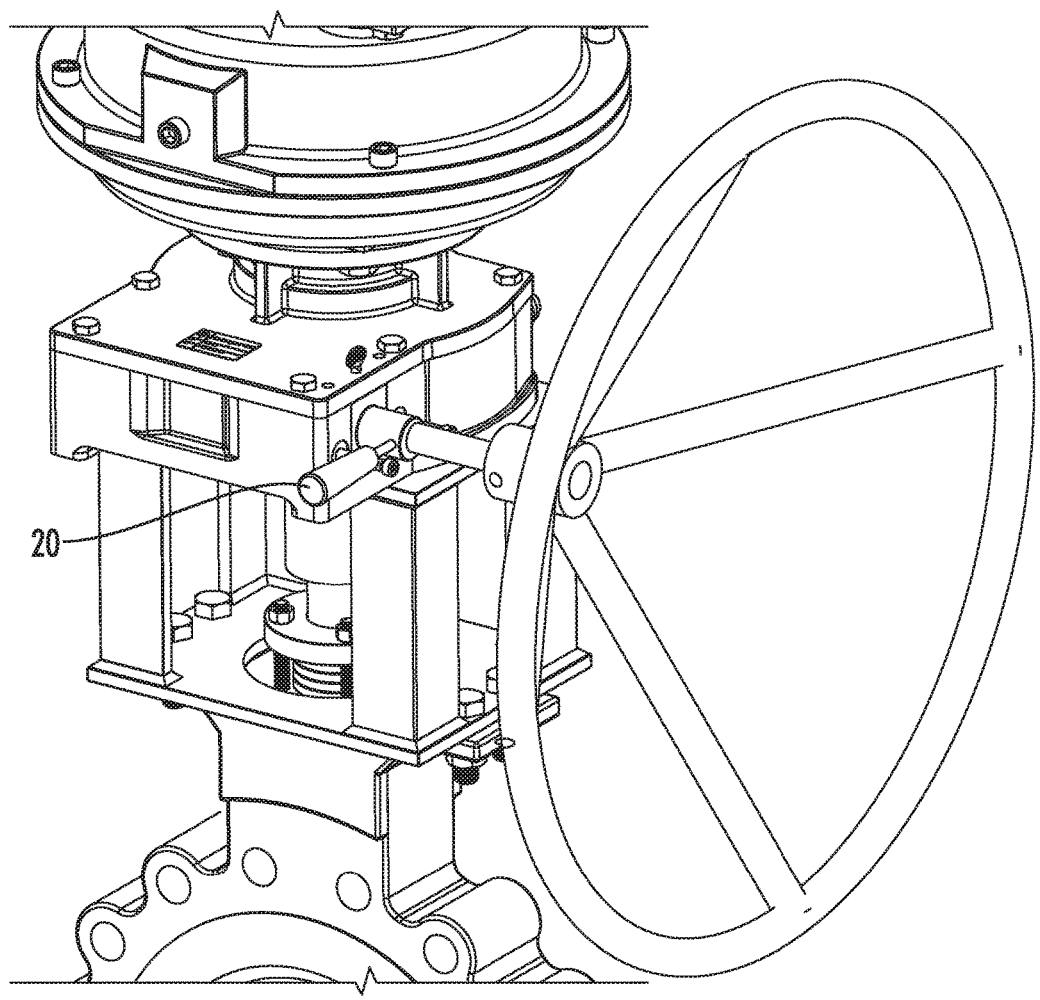
FIG. 7A illustrates a declutch lever in an engaged position according to an embodiment.

The EBV can be operated to either simulate the function of the automatic closing device or to turn the valve 90 degrees open-close as part of a regular maintenance program. The ability to operate the unit ensures that no crucial parts "freeze up" and that the valve is fully operational. To operate the unit toward the closed position, the steps in "CLOSED BY ACTIVATING WITH PUSHBUTTON" of Section 1 above are followed. Once the valve is closed, all air supply to the unit is removed. The declutch lever 20 is engaged as shown in FIG. 7A. The valve can now be fully opened and closed by turning the declutchable manual override handwheel. A caution note that the unit must be reset (re-armed) after the manual operation.

3. Resetting the Unit

Once the unit has been closed via one of the methods listed in Section 1 ("ACTIVATION"), the valve can be returned to the open position to be reset by following these steps:

1) Remove the air supply to the solenoid valve 17 and pneumatic actuator 12.
   2) Engage the declutch lever 20 as shown in FIG. 7A. Turn the handwheel 5 counterclockwise until the valve is fully open. (NOTE: Declutch stops are set so that handwheel stops turning when the valve is fully open.)

3) Once the valve is fully open, return air to the solenoid/pneumatic actuator.

4) The actuator arm 1 turns clockwise, moving the lever 2 into position to lock the spring cam 4.

Figure 7B:
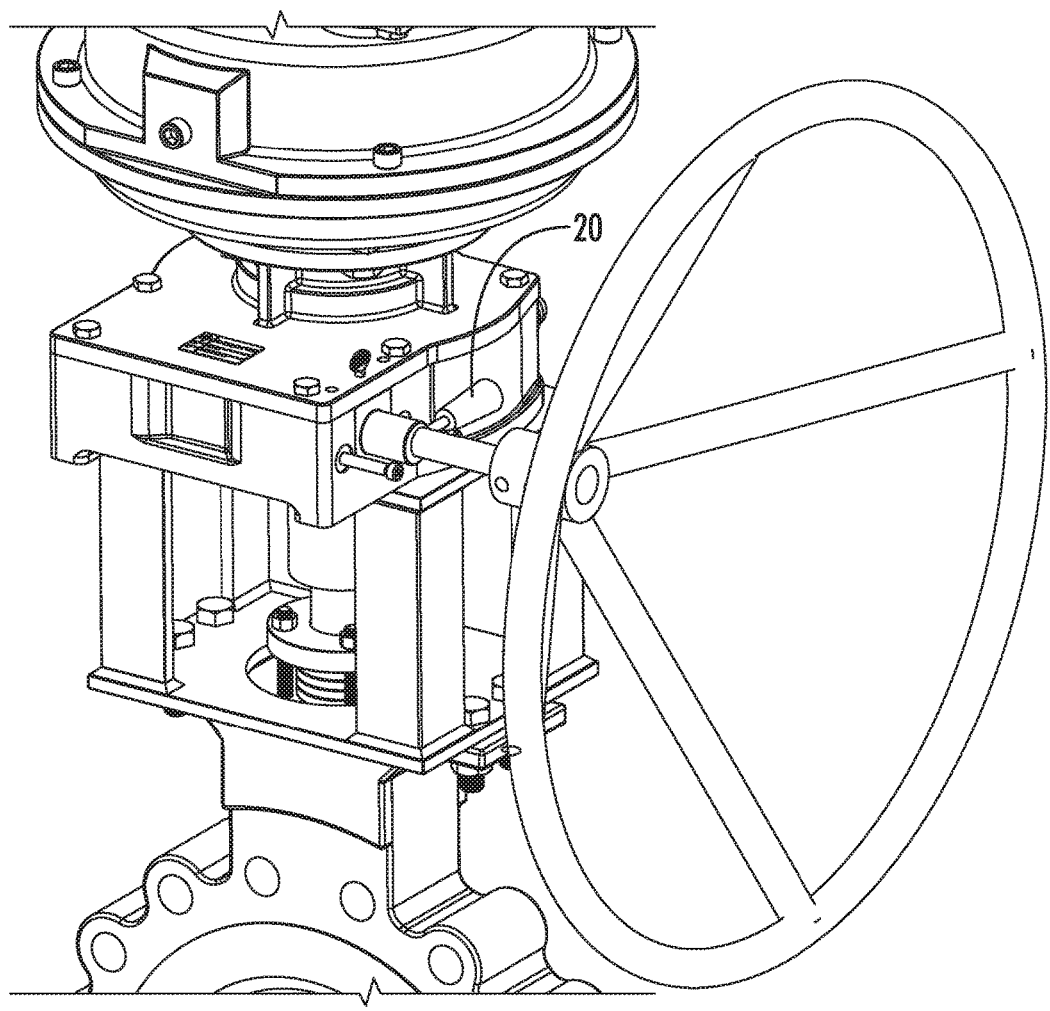
FIG. 7B illustrates a declutch lever in a disengaged position according to an embodiment.

5) While keeping air active, disengage the declutch lever as shown in FIG. 7B and ensure that the handwheel turns freely.

6) The unit is now armed.

As can be seen from the above, the EBV according to an embodiment provides many unique advantages that are absent in the existing EBVs. These advantages include its ability to be subjected to function testing with minimum effort by a single operator and no impact on the valve components.

Note that for a valve opening device according to an embodiment, the above operation steps are similar. In this case the start position is a closed valve position, and the spring drives the valve from the closed position to the open position upon activation.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A device for controlling a flow of fluid from a first side to a second side of a passageway, comprising:

a valve situated within a connection between the first side and the second side;

a spring configured to rotate the valve from a first position to a second position;

a cam attached to the spring;

a lever having a first end, a second end and a pivot located between the first and second ends;

a rotary actuator comprising a first and second arms rotatable about a rotational axis of the actuator, wherein a rotation of the actuator causes the first arm to move the first end of the lever in one direction and an opposite rotation of the actuator causes the second arm to move the first end of the lever in an opposite direction, and the actuator is configured to switch the lever between a first state and a second state;

a handle for manual operation of the valve between the first position and the second position; and a declutch mechanism for engaging and disengaging the handle for manual operation with the valve;

wherein the second end of the lever is configured to engage the cam, holding the spring from rotating the valve when the lever is in the first state, and to disengage the cam, releasing the spring when the lever is in the second state.

2. The device of claim 1, wherein the actuator is configured to switch the lever from the first state to the second state when activated by a sensor which detects a predetermined event at the device.

3. The device of claim 1, wherein the actuator is configured to switch the lever from the first state to the second state when activated by an electric signal.

4. The device of claim 1, wherein the actuator is a pneumatic actuator configured to switch the lever to the first state when air is supplied, and to switch the lever to the second state when air is not supplied.

5. The device of claim 4, wherein the device comprises a fusible plug in an air line to a supply port on the pneumatic actuator such that in an event of fire or heat, the fire or heat melts the plug causing a loss of air supplied to the pneumatic actuator.

6. The device of claim 4, wherein air is supplied through a solenoid valve.

7. The device of claim 6, wherein the solenoid valve is controlled by an electric signal or by a push of a button.

8. The device of claim 1, further comprising a dampening device configured to dampen a rotational force caused by the spring.

9. The device of claim 1, wherein the valve is a disc such that the valve is moved between the first position and the second position by 90 degrees rotation of the disc.

10. The device of claim 1, further comprising a stop configured to stop the rotation of the valve by the spring when the valve is in the second position.

11. The device of claim 1, further comprising a stop configured to stop the valve from further rotating by the handle for manual operation when the valve is in the first position.

12. The device of claim 1, wherein the handle for manual operation is a handwheel.

13. The device of claim 1, wherein the first position is where the valve is fully open and the second position is where the valve is closed.

14. The device of claim 1, wherein the first position is where the valve is closed and the second position is where the valve is fully open.

15. The device of claim 1, wherein the actuator is configured to switch the lever from the first state to the second state when activated by a user depressing a button located on the device.

* * * * *